Dec. 25, 1934.　　　　F. A. HART　　　　1,995,826
TYPEWRITING MACHINE
Filed April 22, 1929　　　4 Sheets-Sheet 4
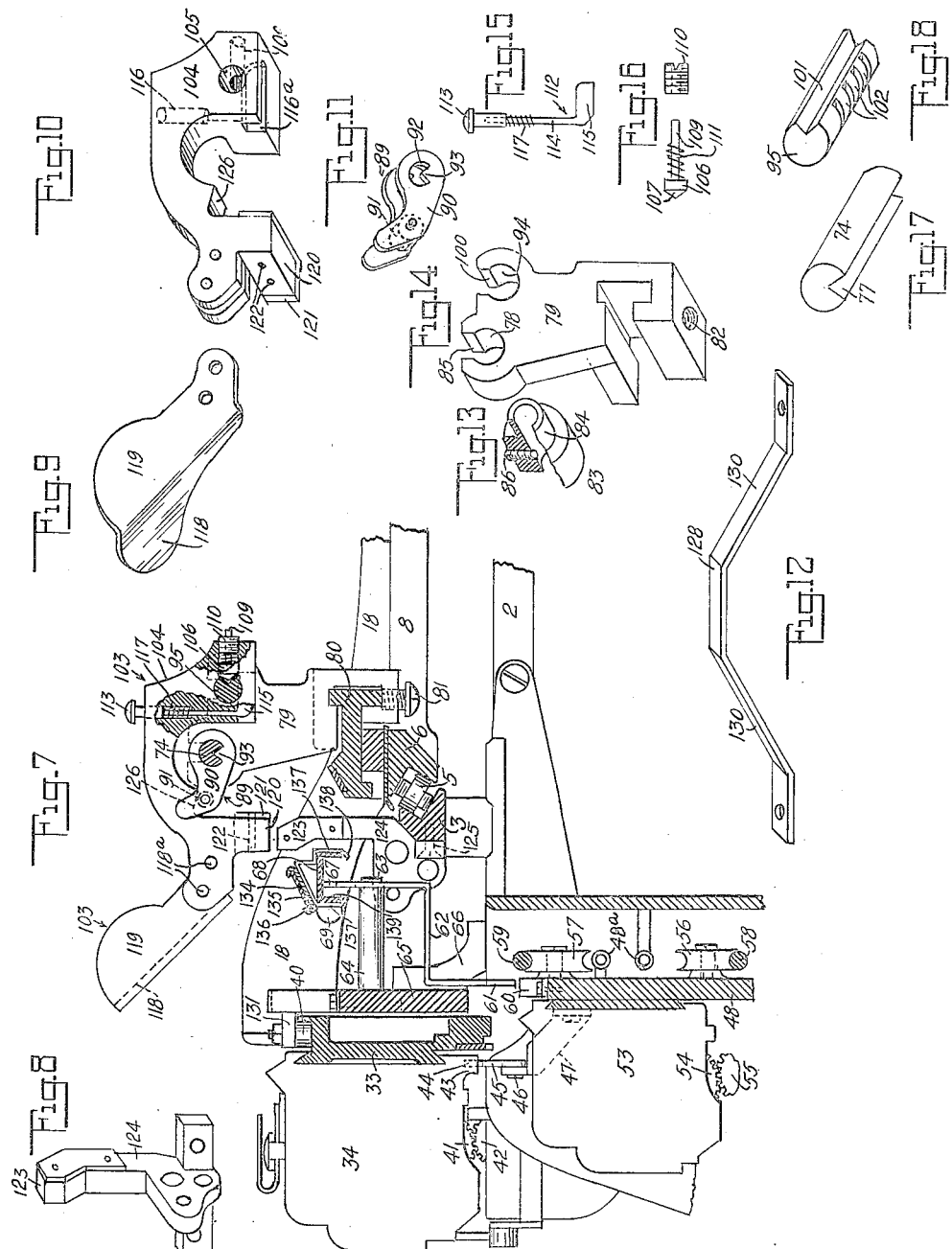
WITNESSES
INVENTOR
F. A. Hart
BY Barton A. Beau Jr.
ATTORNEY Patented Dec. 25, 1934

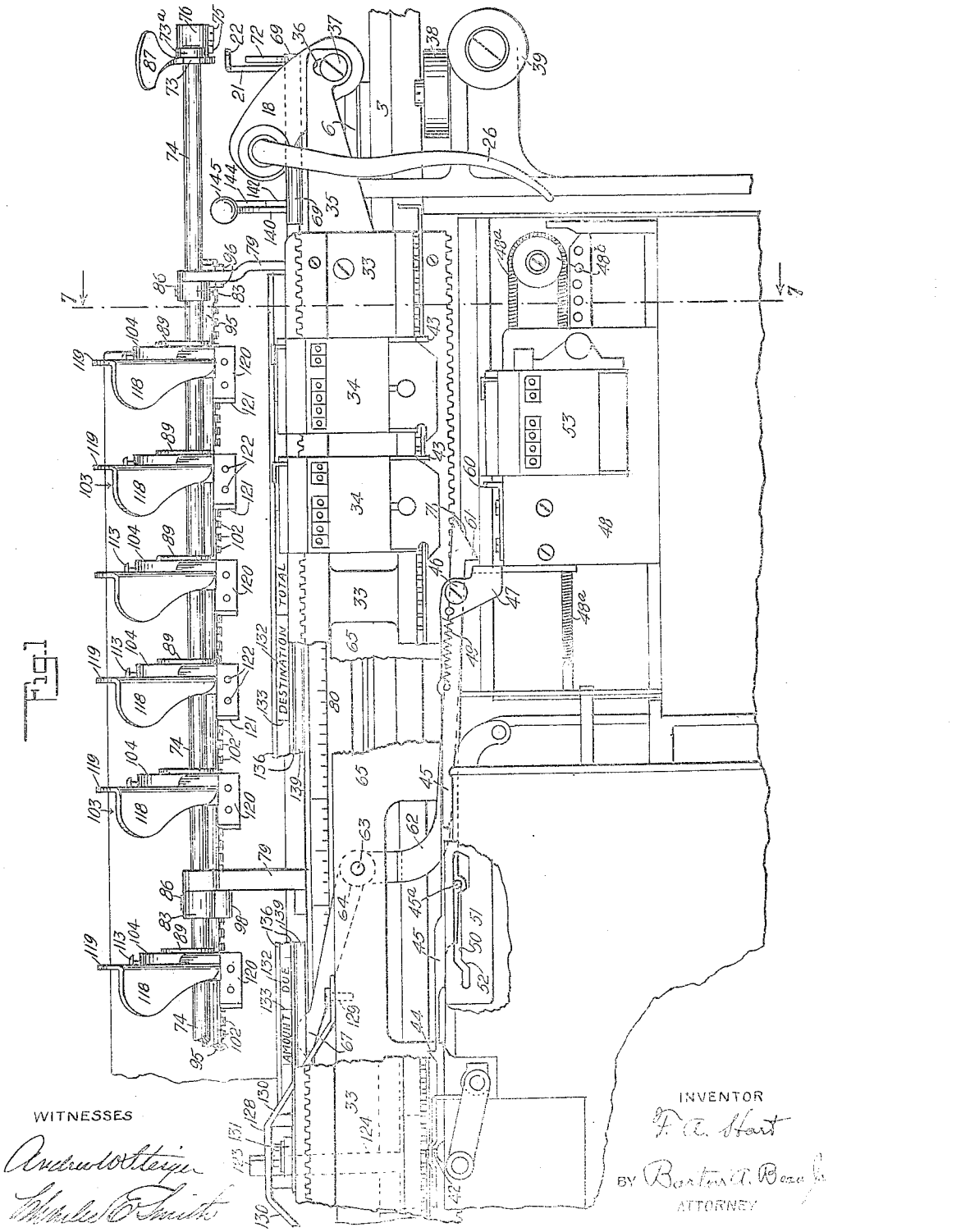

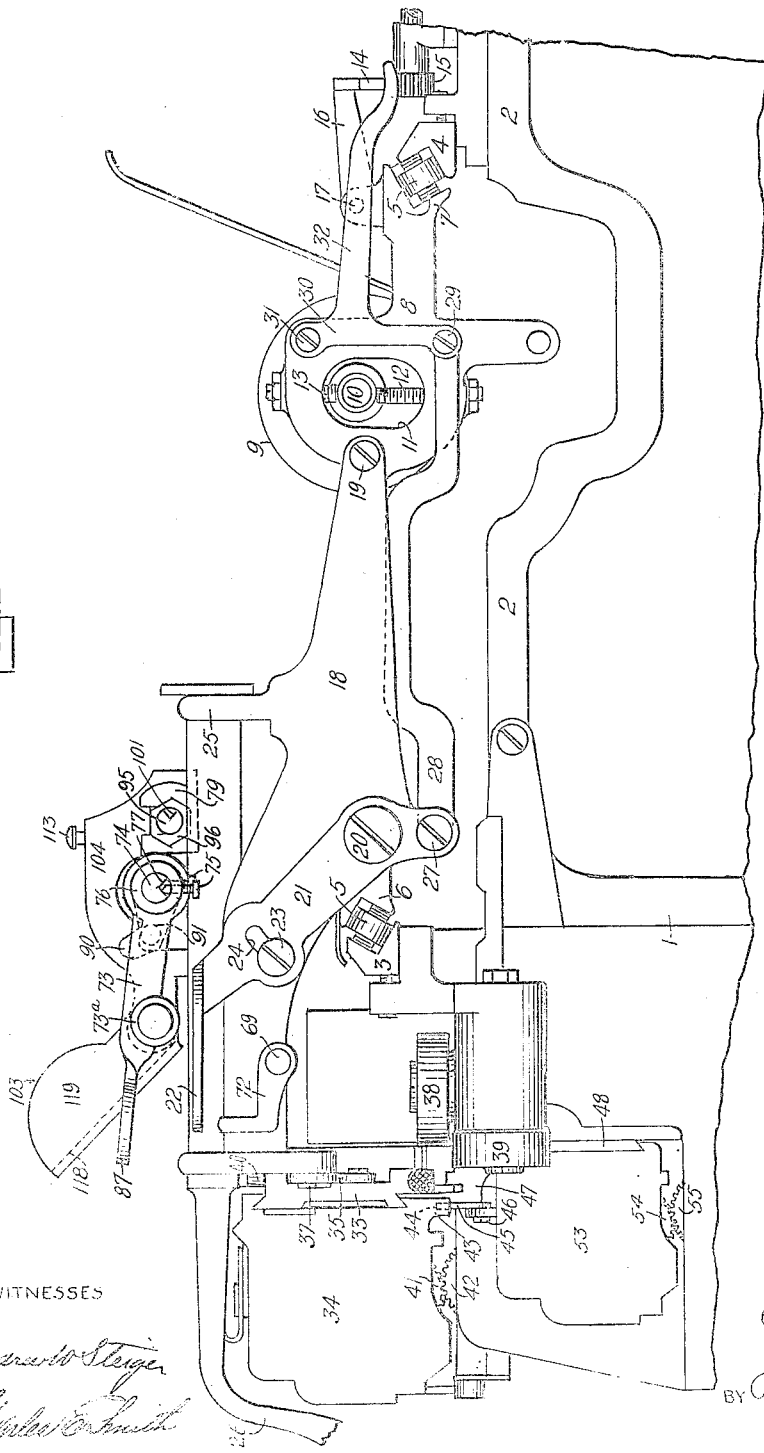

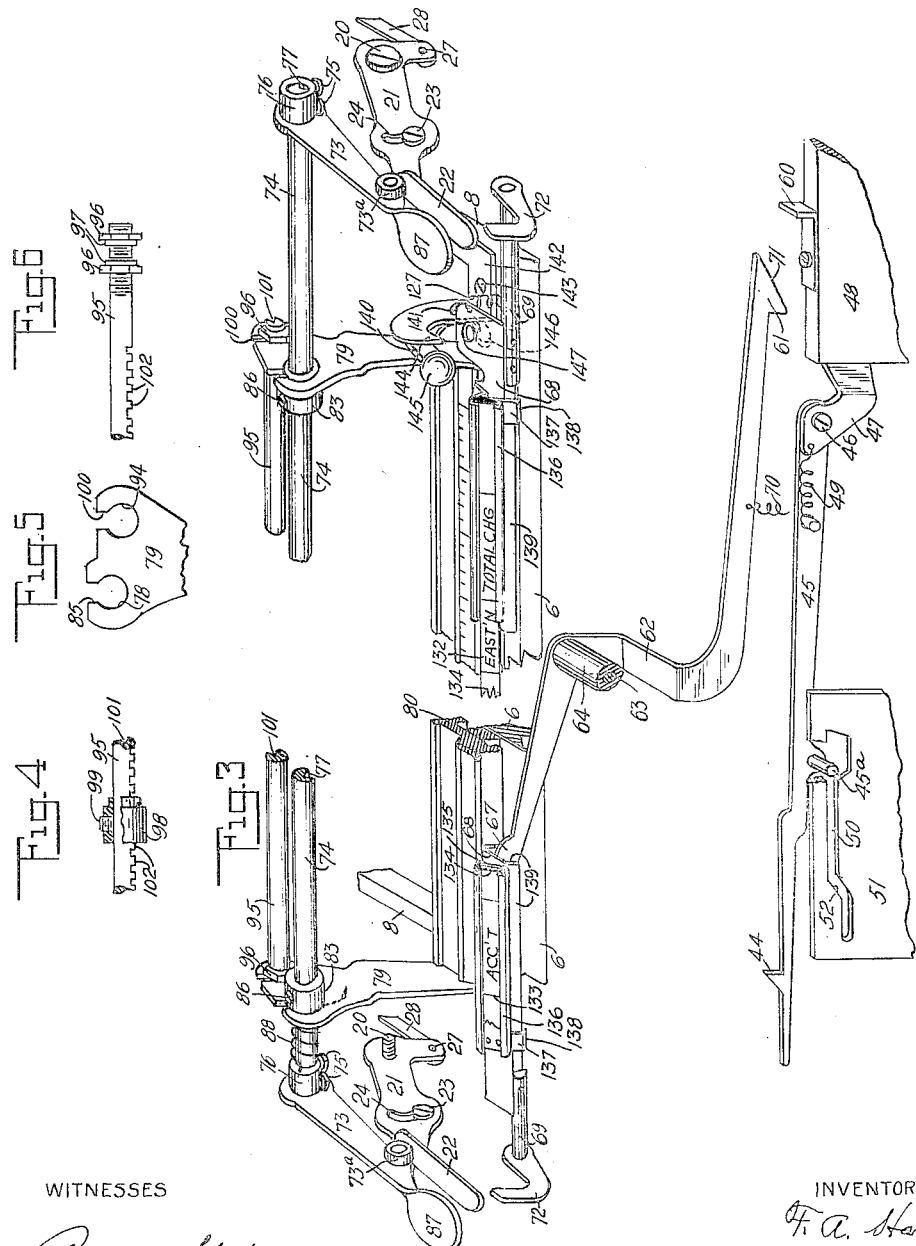

1,985,826

UNITED STATES PATENT OFFICE 1,985,826

TYPEWRITING MACHINE

Frederick A. Hart, New Britain, Conn., assignor to Remington Typewriter Company, Ilion, N. Y., a corporation of New York Application April 22, 1929, Serial No. 357,135

5 Claims. (Cl. 197—176)

My invention relates to typewriting machines and to combined typewriting and computing machines, and is directed more particularly to tabulator mechanism.

One of the main objects of my invention, generally stated, is to provide comparatively simple and highly efficient means of the character specified.

A further object of my invention is to provide means of the character specified which may be readily embodied in existing machines without modifying, or materially modifying, the existing structural features thereof, and without interfering with the employment of existing features included in such machines.

A still further object of the invention is to so construct devices of the present invention that they are in the nature of attachments that may be readily applied to or removed from such existing machines without removing or altering other parts thereof.

To the above and other ends which will hereinafter appear my invention consists in the features of construction, arrangements of parts and combinations of devices set forth in the following description and particularly pointed out in the appended claims.

In the accompanying drawings wherein like reference characters indicate corresponding parts in the different views:—

Fig. 1 is a fragmentary, front elevation, with parts broken away, showing the upper right hand portion of a combined typewriting and computing machine embodying my invention.

Fig. 2 is an end view of the same.

Fig. 3 is a detail, skeletonized, perspective view, showing parts of the mechanism.

Figs. 4, 5 and 6 are fragmentary, detail views of parts that enter into the structure.

Fig. 7 is a fragmentary, vertical, fore and aft, sectional view of the machine taken on the line 7—7 of Fig. 1 and looking in the direction of the arrows at said line.

Figs. 8 to 18 inclusive are detail views of parts that enter into the structure, such parts being shown detached.

I have shown my invention embodied, in the present instance, in a "No. 23 Remington Front Feed" machine equipped with an "F" carriage, although only so much of this machine is shown as is necessary to understand my invention in its embodiment therein.

While the devices of my present invention may be readily included in said machine in the nature of attachments, which may be applied to or removed therefrom at will, without modifying or materially modifying its other structural features, it should be understood that the invention is not limited to use in such machines but may be employed in typewriting machines generally, wherever found available.

The frame of the machine comprises the usual base (not shown), corner posts 1 and top plate 2. On the top plate are supported front and rear fixed guide rails 3 and 4 respectively grooved in opposite faces to receive anti-friction rollers 5. These rollers are also received in oppositely grooved carriage rails 6 and 7, which constitute the front and rear cross bars respectively of the carriage truck and which are united by end bars 8 to form a rectangular frame. A cylindrical platen 9 receives a bearing in a platen frame connected to the truck in the usual manner. The platen has spindles 10 that extend through slots 11 in the end bars 8 of the truck, the platen and platen frame, in the present instance, being fixed in the upper case position by screwing up the lower case shift screw stops 12, holding the platen from case shifting movement against the upper limiting stops 13.

A feed rack 14 meshes with the usual feed pinion 15 and is carried by arms 16 pivoted at 17 on the carriage truck.

A cast bracket 18 is secured by a screw 19 and a shouldered pivot screw 20 to each end bar 8 of the carriage. A carriage release lever 21 is pivoted by the associated pivot screw 20 on each of the brackets 18 and terminates in a finger piece 22 at its upper end. Each lever 21 is held against lateral deflection away from its bracket by a shouldered headed screw 23, the stem of which passes through a slot 24 in the associated lever and is received at its threaded end in its bracket 18. The brackets 18 at opposite ends of the carriage are substantially alike except that the right hand bracket is provided with a bearing portion 25 that receives the shaft to which the line spacing handle 26 is connected.

The lower end of each lever 21 is pivoted, at 27, to a link 28 which in turn is pivoted at its rear end, at 29, to an angular lever 30. This latter lever is pivoted, at 31, to the associated end bar 8 of the carriage truck and has an arm 32 which extends beneath the feed rack 14 to lift the latter and disengage it from the feed pinion 15, thus freeing the carriage for movement in the direction of its travel under power of the usual spring drum, not shown.

I have not shown any of the paper feeding and controlling devices etc. which enter into the construction of the so-called "Remington Front Feed Machine", as such parts are unnecessary to an understanding of my present invention. It is sufficient to point out that said devices may be employed in such machine without being interfered with by the devices of the present invention and without the latter interfering in any way with such paper feeding and controlling devices etc. It should be understood, moreover, that the column selecting mechanism and parts controlled thereby which are disclosed herein, may be effectively employed in said "Front Feed Machines" to operate in conjunction with the front feed mechanism and greatly facilitate the work produced, although said column selecting mechanism and the parts controlled thereby are capable of use in other machines and are not restricted to embodiment in said "Front Feed Machines."

The machine in which my invention is shown embodied includes the usual computing mechanism somewhat similar to that disclosed in the patent to Wahl 1,270,471 dated June 25, 1918, the said computing mechanism comprising vertical totalizers and a jumping cross truck for a cross totalizer which is automatically picked up and carried along with the typewriter carriage as each vertical totalizer approaches the computing zone, and is automatically released and returned to normal position as each vertical totalizer passes out of said zone. During a tabulating operation there is apt to occur repeated forward and back movements of the cross truck during the single travel of the typewriter carriage in one direction to the point of its arrest determined by the actuation of the tabulator.

These repeated forward and back movements of the cross truck are unnecessary and objectionable at this time and the tabulator mechanism of my invention is shown in the present instance combined with means for silencing the cross truck, or maintaining it against repeated forward and back movements, during the travel of the carriage under control of the column selecting mechanism.

I will first describe only sufficient of the usual and well known computing mechanism of the machine referred to as is necessary to arrive at an understanding of the use of my tabulator mechanism in connection therewith, and will then describe how the tabulator is constructed and operates to control the cross truck.

A supporting bar 33 for the detachably connected vertical totalizers 34 is provided at its ends with bracket arms 35 each slotted vertically at 36 to loosely receive the stem of a shouldered and headed screw 37 threaded into a tapped opening in a bracket 18. The bar 33 is supported and guided by rollers in the usual manner, certain only of said rollers, 38, 39 and 40, being shown. Each totalizer has a series of wheels 41 adapted to be brought successively into mesh with a master wheel 42 as such totalizer is given a step-by-step movement through the computing zone with the carriage. The master wheel 42 is turned in the usual manner varying distances depending on the numeral key which is actuated.

As each vertical totalizer 34 passes into the computing zone a pick-up lug 43 on its right-hand side plate engages a hook-like projection 44 on a pick-up beam 45. This beam is pivoted at 46 on a bracket arm 47 extending forward from a cross truck 48 to which the bracket is secured. A spring 49 tends to hold the hook carrying end of the beam 45 elevated so that the projection 44 normally will be in the path of movement of the lugs 43. When the projection is engaged by any of said lugs the cross truck will move forward with the carriage against the force of a spring 48$^a$ anchored at one end and passing around a pulley 48$^b$ and attached at its opposite end to the cross truck 48. As the connected vertical totalizer continues to pass through the computing zone a pin 45$^a$ on the pick-up beam will ride along a horizontally disposed slot 50 in a fixed plate 51. As the wheel 41 of the lowest order in the engaged vertical totalizer 34 passes the master wheel 42 the pin 45$^a$ will pass into the inclined part 52 of the slot 50, 52, camming the pick-up beam down against the force of its spring 49 and disengaging the beam from the lug 43 with which it was engaged. The force of the spring 48$^a$ is now effective to return the cross truck to its normal position ready to be picked up and advanced as before by the lug 43 on the next advancing totalizer 34.

The jumping cross truck 48, in the present instance, as is usual in the machine previously referred to, carries a cross totalizer 53 constructed like the vertical totalizers with wheels 54 adapted to mesh successively with a master wheel 55 as the cross truck advances with the carriage. As best indicated in Fig. 7 the cross truck is supported and guided by rollers 56 which bear against supporting and guide rods 58 and 59 for forward and backward travelling movement.

The cross truck carries an engaging projection or bracket 60 with which a hook-like engaging end 61 of a locking lever 62 is adapted to engage. The lever 62 is pivoted at 63 on a post 64 secured to a bar 65 (see Fig. 7) which in turn is secured to the frame of the machine by brackets 66. The upper end 67 of the lever 62 extends beneath a substantially U-shaped plate, controlling bar or member 68 that extends throughout the length of the carriage and is secured to spindles or shaft sections 69 mounted to turn in bearings in the brackets 18. The end 67 of the lever 62 is pressed up against the plate 68 by a spring 70 (Fig. 3) which tends to hold the engaging portion 61 of the lever in the path of the projection 60 on the cross truck 48, and when said projection advances with the cross truck it will engage the cam face or edge 71 lifting the lower arm of the lever 62 until the engaging portion 61 thereof drops behind the projection 60 under the force of the spring 70. The effect of this is to lock the jumping cross truck in its advanced position and hold it there indefinitely, or as long as the pivoted controlling bar or member 68 remains in the elevated position. This enables the vertical totalizers 34 to pass successively through the computing zone while the cross truck remains silenced or held against repeated forward and back movements. It will be understood that at this time pick-up beam 45 is maintained depressed by the cam slot 52 so that the pick-up projection 44 on said beam is maintained lowered out of the path of the pick-up lugs 43 on the vertical totalizers.

The means for automatically actuating the controlling bar 68 and the carriage releasing means from the column selecting mechanism will now be described.

Each of the spindles 69 extends beyond the bracket 18 in which it is mounted and near its end is provided with a crank arm 72 having an upwardly directed free end which underlies the companion carriage release key 22 to be actuated thereby, to rock the controlling bar 68 anticlockwise, as viewed from the right hand end of the machine. This results in elevating the controlling bar 68 and permitting the locking lever 62 to function as hereinbefore explained.

The actuation of either of the carriage release keys 22 not only controls the locking lever 62 in the manner described but also operates through the associated train of connections 21, 28, and 30 to lift the feed rack 14 and free the carriage from control of the escapement mechanism.

Motion is transmitted to both of the carriage release keys 22 by crank arms 73 adjustably fixed on a rock shaft 74, each crank arm carrying an anti-friction roller 73$^a$ which coacts with the underlying carriage release key. The means for adjusting each of the arms 73 comprises two pointed set screws 75 threaded into tapped openings in a hub 76 carried by the companion arm 73. The inner pointed ends of the screws engage the side walls of a V-shaped spline groove 77 in the shaft, one screw bearing against one side wall and the other screw bearing against the other wall. A backing up of one screw and a threading in of the other raises or lowers the corresponding arm 73 on the shaft, depending on which screw is backed up and which is threaded in.

The rock shaft 74 extends substantially throughout the length of the carriage and preferably is detachably mounted in bearings 78 in supporting brackets 79, one of which brackets is shown in detail in Fig. 14. These brackets are detachably secured to and may be adjusted to different set positions longitudinally of the carriage on a T-headed rail 80, which is itself detachably secured to the front cross bar 6 of the carriage. A set screw 81 is received in a tapped opening 82 in each bracket and bears at its upper end against the rail 80 to secure the associated bracket in its adjusted position.

In order to detachably retain the rock shaft 74 in its bearings in the brackets 79 I have provided, as shown in Figs. 3 and 13, a series of bushings 83 one associated with each bracket 79. Each bushing has a central bearing opening which receives the rock shaft 74 and with a reduced portion 84 which receives a bearing in the bearing opening 78 in the companion bracket 79. Each bearing opening 78 is formed as a part of an open ended key-hole slot, the narrowest portion 85 of which is greater than the diameter of the rock shaft 74. When each bushing has its reduced end portion received in the bearing opening 78 of the companion bracket, where it may be held by a set screw 86 in the bushing, the shaft 74 is prevented from being detached from its supporting brackets. When, however, all of the set screws 86 are loosened and the bushings 83 are slipped along the shaft 74 from the bearings 78, the shaft is free to be lifted through the openings 85 and detached from the machine.

In order that the rock shaft 74 may be rocked manually when desired, as well as automatically, to release the carriage and control the locking lever 62, each arm 73 terminates in a finger piece 87 for rocking the shaft. The return of the rock-shaft 74 to normal position is effected by a spring 88 (Fig. 3) coiled around the left-hand end portion of said shaft and secured at one end to the associated hub 76 and at the other end to the companion bracket 79. The return movement of the rock shaft to normal position is limited by a plurality of crank arms 89 on the rock shaft 74 coacting with a series of column selecting members, as will hereinafter more clearly appear.

In the present instance, each of these crank arms, designated as a whole by the reference numeral 89, as shown in Fig. 11 comprises two like parallel sheet metal arms 90 having an intervening cylindrical spacing rod or block 91 to which the arms are riveted. The heel of each arm 90 is pierced at 92 to conform to the cross-section of the rock shaft 74, leaving a spline projection 93 which is received in the V-shaped spline groove 77 of said shaft. By this arrangement each crank arm 89 is fixed to rock with the shaft 74, but is free to be adjusted along said shaft with the companion column selecting device, as will hereinafter more clearly appear.

A second key-hole, open-ended, bearing 94 is provided in each bracket 79. A fixed pivot rod or spindle 95 arranged parallel with the rock-shaft 74 is detachably fixed in the bearings 94 and extends substantially throughout the length of the carriage. Thus, the ends of the rod 95 are threaded to coact with oppositely positioned nuts 96 (Fig. 6) each provided with a reduced portion 97 adapted to be seated in the enlarged portion of the bearing opening 94 in the associated bracket 79. When the nuts are threaded towards each other and held against the bracket with the reduced portions of the nuts seated in the enlarged portions of the opening 94, the rod 95 will be firmly held in place against rotation and against removal. Intermediate its ends the rod 95 is surrounded with bushings 98 (see Figs. 1 and 4) corresponding to the bushings 83 previously described, each bushing 98 being held in place by a set screw 99. In order to detach the rod 95 from its supporting brackets, the nuts 96 are backed up and the bushings 98 displaced longitudinally on the rod 95 permitting said rod to be lifted up through the contracted openings 100 in the brackets, together with the parts carried by the rod.

The pivot rod 95 is provided with a V-shaped spline groove 101 in the rear side thereof and with teeth 102 at the bottom thereof. A plurality of column selecting devices, each indicated as a whole by the reference numeral 103 and the various parts of which are shown in detail and detached in Figs. 9, 10, 15 and 16, are mounted for pivotal movement on and for adjustment along the pivot rod 95. Thus, the body portion 104 of each member 103 has a hole 105 therethrough to receive the pivot rod on which the part 104 has an up and down pivotal movement. A spring-pressed stop returning device or plunger 106 (shown in detail in Fig. 16) has a pointed end 107 that engages in the groove 101 in the rod and is seated and works in an opening 108 in the rear portion of the part 104. The reduced stem 109 of the plunger 106 is received and guided in a central opening in a screw bushing 110 threaded into a tapped portion of the hole 108. A coiled expansion spring 111 surrounds the stem of the plunger 106 and bears at one end against the head of the plunger and at the opposite end against the associated screw bushing 110. This latter, therefore, provides adjustable means for varying the force to be applied by the spring to its companion plunger. Each column selecting device is provided with such a spring pressed plunger 106, and the effective force thereof against the inclined walls of the groove 101 is exerted to return the companion column selecting device 103 to and maintain it in normal position, (considered with reference to its pivotal movement), without, however, interfering with an axial adjustment of the column selector along ints pivot rod 95. This latter adjustment is to enable each column selector 103 to be readily adjusted to accurately arrest the carriage at the beginning of the columnar field for which that particular column selecting device is set. While only a few column selecting devices are shown, it should be understood that any required number may be employed within the capacity of the machine. In some long carriage machines as many as eighteen or more column selectors may be employed, the construction being such that the number of such selectors may be added to or reduced by merely mounting additional devices 103 on or removing them from the pivot rod 95.

In order to lock each column selecting device 103 in its position of adjustment along the pivot rod 95, there is provided a spring pressed latch 112 having a finger piece 113, a stem 114, and an engaging portion 115. This latch works in an opening 116 (Fig. 10) and in a recess 116ᵃ in the member 104 to which it is applied. A coiled expansion spring 117 (Figs. 7 and 15) tends to lift the latch and hold the engaging portion thereof seated in one of the interdental spaces in the rod 95 provided by the teeth 102. These interdental spaces are at letter space intervals and each latch 112, when engaged, firmly locks its column selecting device against axial displacement along the pivot rod 95 without, however, interfering with the pivotal movement of such device around the rod.

Each member 104 has a finger piece or key 118 riveted at 118ᵃ or otherwise secured thereto. Each finger piece 118 is provided with an upwardly extending flange or finger bearing piece 119 at the right hand edge thereof. The purpose of this flange 119 is to provide a rest against which a finger of the operator may bear to resist and control the movement of the carriage when the key is depressed to release the carriage and cause the companion column selector to function. It will be understood that at this time power of the carriage spring (not shown) is exerted to move the carriage from right to left. However, such movement may be effectively resisted or controlled by the operator's finger maintained not only on the key 118 but against the flange 119. The operator may even move the carriage from left to right against the force of the carriage spring with the aid of the upstanding flange 119, and while the carriage is maintained released by pressure exerted on the depressed key 118.

Each member 104 is provided with a depending stop projection 120 that has a facing strip of wear resisting metal 121 riveted thereto at 122, and which receives the impact by contact of the column selecting stop with the coacting stop 123, likewise faced on its contact side. The stop 123 forms part of a bracket 124 (Fig. 8) secured by screws 125 to the front fixed carriage rail 3. Each member 104 has a contact face 126 adapted to contact with the spacing block 91 of the associated crank arm 89, as shown in Fig. 7. It will be seen from an inspection of this figure that the upper end portion of each of the side plates 90 of a crank arm overlaps the contiguous side of the member 104, each crank arm 89 thus embracing its associated column selecting device on opposite sides, so that each column selector 103 and its crank arm 89 may be adjusted together longitudinally of the carriage to different set positions when the companion latch 112 is released. On the other hand both the selecting device and its crank arm will be held against axial displacement when the associated latch is engaged.

A depression of a key 118 turns the associated column selector 103 on its pivot rod 95 and brings the stop portion 120 into cooperative relation with the fixed stop 123. This operation also is effective through the associated crank arm 89 to rock the shaft 74. The effect of this is to release the carriage as previously pointed out, and at the same time to rock the controlling bar 68. This results in swinging the bar 68 up around the axis of the spindles 69 and permitting the locking hook 61 to move down into cooperative relation with the projection 60 on the cross truck and silencing the operation of the latter, as previously explained.

When the carriage has been arrested in its column selected position, the operator releases the depressed key 118 and said key and the parts controlled thereby return to their normal positions. The depressed key 118 when released is returned by its spring pressed plunger 106 to normal position, and the rock shaft 74 is returned to normal position by its spring 88, thereby releasing the feed rack 14 for reengagement with its feed pinion 15. The release of the crank arms 72 enables the bar 68 to be drawn down by a spring 127 (see Fig. 3) of sufficient force to overcome the force of the spring 70, and return the locking lever 62 to ineffective position, thereby releasing the cross truck 48 and permitting it to be returned to normal position by its spring 48ᵃ.

In order to prevent an overlapping portion of the operator's finger from accidentally catching on a fixed portion of the machine while the operator is holding a key 118 depressed and the operator's hand is moving with the carriage, I have provided a guard or shield 128 in the nature of a strip of metal secured by screws 129 to a fixed portion of the machine. This strip is provided with oppositely disposed inclined faces 130 which act in the nature of cam faces that will deflect the overlapping portion of the operator's finger up and prevent it from catching on the portion 131 (Fig. 1). Of course this guard only comes into use in the event that the operator depresses a key 118 improperly. A proper operation of a key 118 will not bring the operator's finger into a position where it can catch on the part 131, or any other fixed part of the machine, while the operator's hand is moving with the carriage. It will be observed that the guard acts with equal effectiveness whether a depressed key 118 is moving with the carriage from left to right or from right to left past the part 131.

In order to facilitate an adjustment of each of the column selecting devices (and associated crank arm) along the carriage to proper column selecting position, I have provided indices beneath such devices and with the aid of which said devices may be adjusted. In the present instance, these indices, as shown in Figs. 1 and 3, constitute column markings 132 and 133 corresponding to the headings on the sheet to be filled in and the limits of each column in which the writing is to be effected. These markings are on a narrow strip 134 which may be cut from a sheet such as is to be used in the machine. This strip is inserted endwise in a groove in a bar 135 having overlapping edges 136 between which the indices are exposed. The bar 135 extends throughout, or substantially throughout the length of the carriage beneath the column selecting device 103, and as shown in Fig. 7, is provided with depending spring arms 137 that terminate in inwardly bent ends 138. These arms may be provided at various points throughout the length of the bar 135 and are adapted to embrace and engage below the lower edges of the depending flanges 139 formed on the controlling member or bar 68, for detachable connection therewith. From an inspection of Fig. 7, it will be seen that the rear spring arms 137 are longer than the corresponding front arms so that the index will be maintained in an inclined position where it presents a better view to the operator. It will be understood that the depending flanges 139 on the controlling bar 68 aid in providing a more rigid construction for said bar.

In adjusting each column selecting device 103 along the carriage, the contact face 121 of its stop is brought into register with the left-hand column limiting index mark 133 of the column to be selected by said device, and the selecting device is latched in this position.

It will be seen that, due to the fact that each of the supporting brackets 79 may be adjusted to different points along the carriage, if it be found that any of the intermediate brackets is located at a point where it is desired to locate a column selecting device, such bracket may be moved along or adjusted to a point where it will not interfere with locating said column selecting device where desired.

It is sometimes desirable to free the pick-up mechanism from automatic control by the column selecting mechanism, so that said pick-up mechanism will be silenced indefinitely and without being affected by the column selector. This is provided for by a manually controlled curved lever 140 pivoted at 141 (Fig. 3) on an angular bracket 142, secured by a screw 143 on the front rail or cross bar 3 of the carriage. An upright arm of this bracket, to which the lever 140 is pivoted, has a forwardly extending projection 144 that overlies the bar 68 and limits its upward pivotal movement. The lever 140 terminates at its upper end in a finger piece 145 and at its lower end in a rounded end 146 that underlies the bar 68. When it is desired to free the pick-up mechanism from automatic control of the tabulator and carriage releasing means, or in other words to render and maintain indefinitely the locking lever 62 effective, this may be done by throwing the finger piece 145 back. This results in elevating the end 146 of the lever, which will coact with the underside of the bar 68 and swing the latter on its pivot to elevated position against the force of the spring 127. When the rounded end 146 of the lever reaches an opening 147 in the bar 68 it will seat itself in said opening and act as a detent to hold the parts in the position indicated. The bar 68 being thus maintained elevated, the spring 70 becomes effective to hold the engaging end 61 of the locking lever in its lowered or effective position, in order to hold the cross truck 48 against movement, once it is advanced to be engaged by the locking lever 62.

A detail description of the operation further than has been hereinbefore pointed out is deemed unnecessary.

It will be seen that I have provided simple and effective means for attaining the purposes set forth and it should be understood that the means for transmitting the required movement from the column selecting keys to the various parts for the purposes set forth are sturdy and reliable in operation and are highly satisfactory in practice in long carriage as well as short carriage machines. The successful operation of the parts in a long carriage machine is a severe test of the reliability of action and the present invention meets this test to the highest degree of perfection.

Various changes may be made in the construction, and some features may be employed without others, without departing from my invention as it is defined in the accompanying claims.

What I claim as new and desire to secure by Letters Patent, is:—

1. The combination of a typewriter carriage, manually controlled carriage releasing members carried thereby, a tabulator stop on the frame of the machine, a plurality of key controlled column selecting stop members carried by the carriage, a rock shaft which extends longitudinally of the carriage and is rocked by an operation of any of said column selecting members, means for supporting said rock shaft intermediate the ends thereof as well as near its ends and means on said rock shaft which coact with said carriage releasing members to release the carriage.

2. The combination of a typewriter carriage, manually controlled carriage releasing members carried thereby, a tabulator stop on the frame of the machine, a plurality of key controlled column selecting stop members carried by the carriage, a rock shaft which extends longitudinally of the carriage and is rocked by an operation of any of said column selecting members, means for supporting said rock shaft intermediate the ends thereof as well as near its ends, means on said rock shaft which coact with said carriage releasing members to release the carriage, means that enable said rock shaft to be rocked independently of said key controlled column selecting members, and one or more keys on said rock shaft for rocking said shaft and effecting a release of the carriage independently of an operation of the column selecting members.

3. The combination of a typewriter carriage, manually controlled carriage releasing members carried thereby, a tabulator stop on the frame of the machine, a plurality of key controlled column selecting members carried by the carriage and each independently adjustable to different set positions along the carriage, a rock shaft which extends longitudinally of the carriage and is rocked by an operation of any of said column selecting members, means for supporting said rock shaft intermediate the ends thereof as well as near its ends and means on said rock shaft which coact with said carriage releasing means.

4. The combination of a typewriter carriage, manually controlled carriage releasing members carried thereby, a tabulator stop on the frame of the machine, a plurality of key controlled column selecting members carried by the carriage and each independently adjustable to different set positions along the carriage, a rock shaft carried by the carriage and extending longitudinally in the direction of the length of the carriage, a plurality of crank arms carried by said rock shaft to turn therewith but free for adjustment along said shaft, intermediate operative connections between each of said key controlled column selecting members and its associated crank arm, whereby each column selecting member and its associated crank arm may be adjusted together to different positions along the carriage, and means on said rock shaft which coact with said carriage releasing means.

5. The combination of a carriage, supporting brackets detachably fixed thereon, a pivot rod, means for detachably securing said pivot rod to said brackets, a series of key controlled column selecting stop carrying members mounted for pivotal movement on said pivot rod and detachable therewith, a rock shaft detachably mounted in bearings on said brackets, crank arms mounted on said rock shaft and detachable therewith and with which said key controlled stop carrying members coact, and carriage releasing means controlled by said rock-shaft.

FREDERICK A. HART.